United States Patent Office
3,514,621
Patented May 26, 1970

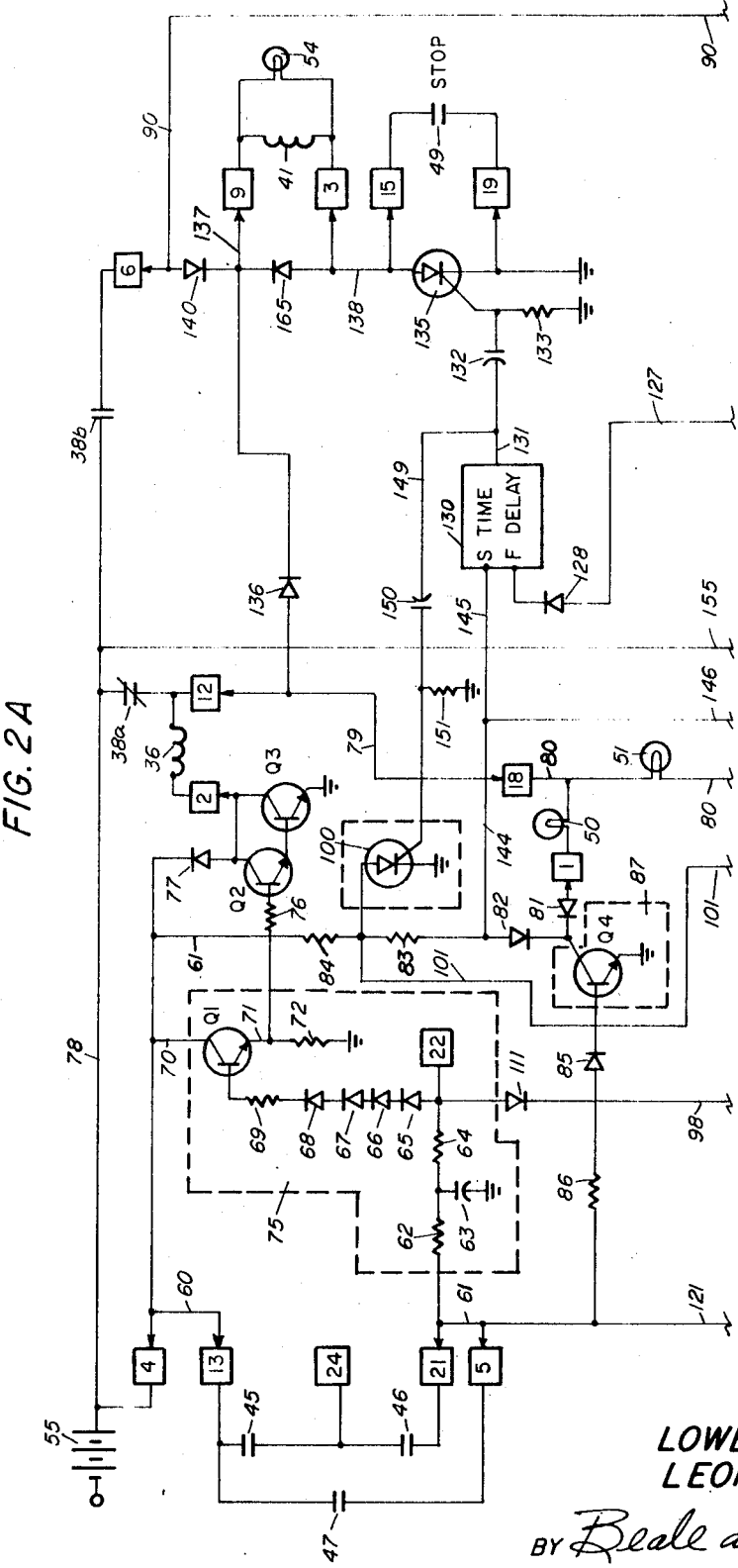

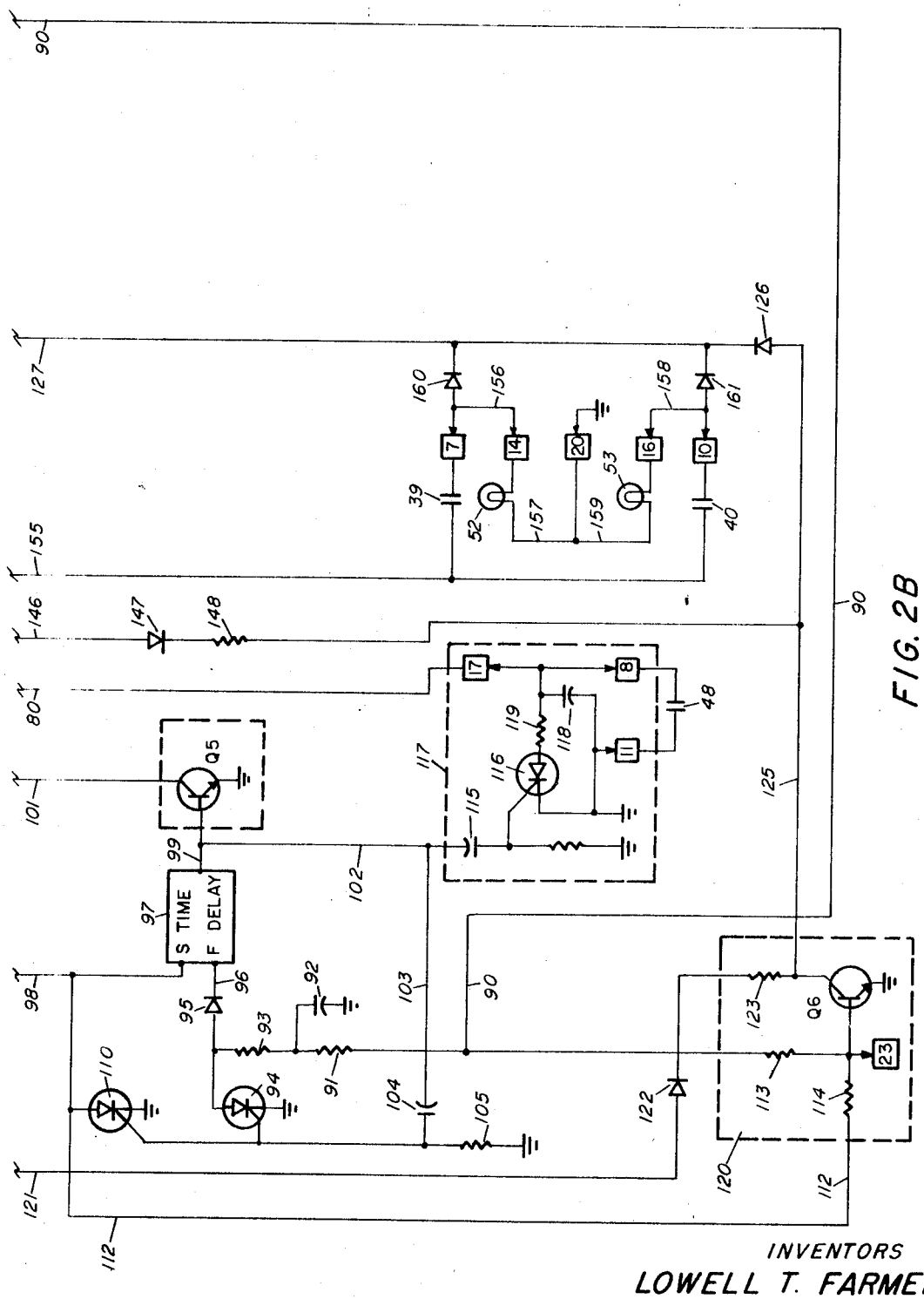

3,514,621
SOLID STATE CRANKING MODULE
Lowell T. Farmer, Hyde Park, N.Y., and Leon B. Crocker, Richmond, Va., assignors to Power Systems and Controls, Incorporated, Richmond, Va., a corporation of Virginia
Filed Feb. 13, 1967, Ser. No. 615,556
Int. Cl. F02n 11/00
U.S. Cl. 290—37  25 Claims

ABSTRACT OF THE DISCLOSURE

Solid state circuitry for controlling starting operation of internal combustion engine, for monitoring its condition during running, and for automatically shutting down engine upon occurrence of a fault. Circuit includes timing networks for limiting the cranking time and for allowing the engine to run a selected period of time after shutdown, unless shutdown is due to a fault condition.

BACKGROUND OF THE INVENTION

The present invention relates to automatic circuits for starting, stopping and monitoring internal combustion engines. More particularly, the invention relates to an all solid state module for such operations, wherein the starting sequence for diesel or gasoline engines is automatically timed to produce thirty seconds of engine cranking. If the engine does not start in this period of time, the starting circuit is opened. If the engine starts, the circuit monitors oil pressure, engine temperature and engine speed as the engine runs, and, upon detection of a fault condition, automatically shuts down the engine and prevents it from being restarted until it is manually reset. Upon opening of a set of start contacts, the engine shuts down after a predetermined delay period which is utilized to permit the engine to cool.

Control circuits for automatically controlling the operation of internal combustion engines are, of course, known in the prior art. However, such prior devices were electromechanical in nature, involving manually or electrically operated mechanical relays and switches. Although such devices worked satisfactorily under certain conditions, they inherently presented problems of reliability after extended periods of use or when subject to certain external conditions such as vibration, the corroding and wearing of the contacts in the first case, and the bouncing of the contacts in the second case, presenting problems in establishing and maintaining circuit continuity. Additionally, the mechanical devices were less sensitive to small variations in operating signals because of mechanical inertia, among other things, and thus were less responsive to the changes being detected. Further, the mechanical devices were relatively slow in operation, often being insufficiently fast to react to a fault condition in time to prevent damage to the engine being controlled.

The present invention overcomes the disadvantages of the prior art by providing a solid state cranking module which takes advantage of the extremely fast switching time of transistors and silicon controlled rectifiers to provide fast and reliable operation. The present invention is relatively insensitive to vibration and, by eliminating the need for mechanical contacts within the module, eliminates most of the reliability problems of the prior art. The present system provides very accurate timing of the various steps of the operation and provides a system which is more sensitive to the various control signals. Furthermore, the solid state circuitry is more compact, easier to handle and less affected by environment than the prior electromechanical devices.

SUMMARY

Accordingly, the present invention provides a solid state cranking module adapted to be mounted either on an engine housing or at a suitable remote location for controlling and monitoring the operation of the engine. The module portion of the circuit is adapted to be plugged into a cranking panel on which is mounted the mode selection switch and the indicator lights for the various engine conditions being monitored. It will be apparent that the various fault sensing mechanisms as well as the engine starting motor will be located at the engine to be controlled. The invention includes a transistor switch which is energized when the manually operated selector switch is in the "start" mode. The output of the transistor switch is amplified and applied to energize a magnetic switch for the starting motor. At the same time, a first timing network is energized so as to limit the length of time that the engine will be cranked by the starting motor in the event that the engine fails to start. The starting of the engine is sensed by a pair of oil pressure contactors; when the oil pressure reaches a predetermined value the magnetic switch is deenergized and the transistorized cranking switch is turned off. If no fault condition occurs, the engine will continue to run until the selector switch is operated to open the "start" switches, at which time the bias voltage on the base of a stop circuit transistor is removed. This transistor then becomes nonconductive, producing a pulse which is applied to the first input of a second, or "shutdown," timing network. After a delay of approximately ninety seconds, which delay is provided to permit the engine to cool after its load has been disconnected, the timing network produces an output signal. This signal triggers a silicon controlled rectifier to close a solenoid valve in the fuel line of the engine and, at the same time, illuminates a "fuel off" indicator light. As the engine slows down, the oil pressure will drop, thus shifting the oil pressure contactors to reset the silicon controlled rectifier for the next shutdown operation and to prepare the starting motor magnetic switch for the next starting operation.

If a fault condition occurs during the running of the engine, one of the fault detector means will produce a signal which is applied to the second input of the second timing network. This fault signal causes the timing network to produce an output signal without the long delay of the first input, thus causing an immediate shutdown of the system. Although the first input to this timing network includes a latching circuit for limiting the output to a single pulse during normal shutdown, the second input has no such latching circuit and, therefore, continues to provide input pulses as long as the fault condition exists. This causes the second timing network to produce a series of pulses which repeatedly trigger the silicon controlled rectifier, preventing it from being reset in the normal manner and thus holding the fuel supply solenoid valve closed. The starting module will thus hold the engine inoperative until the fault condition is corrected and the mode selector switch is shifted to the "stop" position to reset the silicon controlled rectifier.

These and other features of the present invention may be more fully appreciated when considered in the light of the following specification and drawings in which:

BRIEF DESCRIPTION OF THE DRAWINGS

FIGS. 2A and 2B are a schematic diagram of the subject system, but including block diagrams of the two timing networks;

DESCRIPTION OF THE PREFERRED EMBODIMENT

Figure 1:
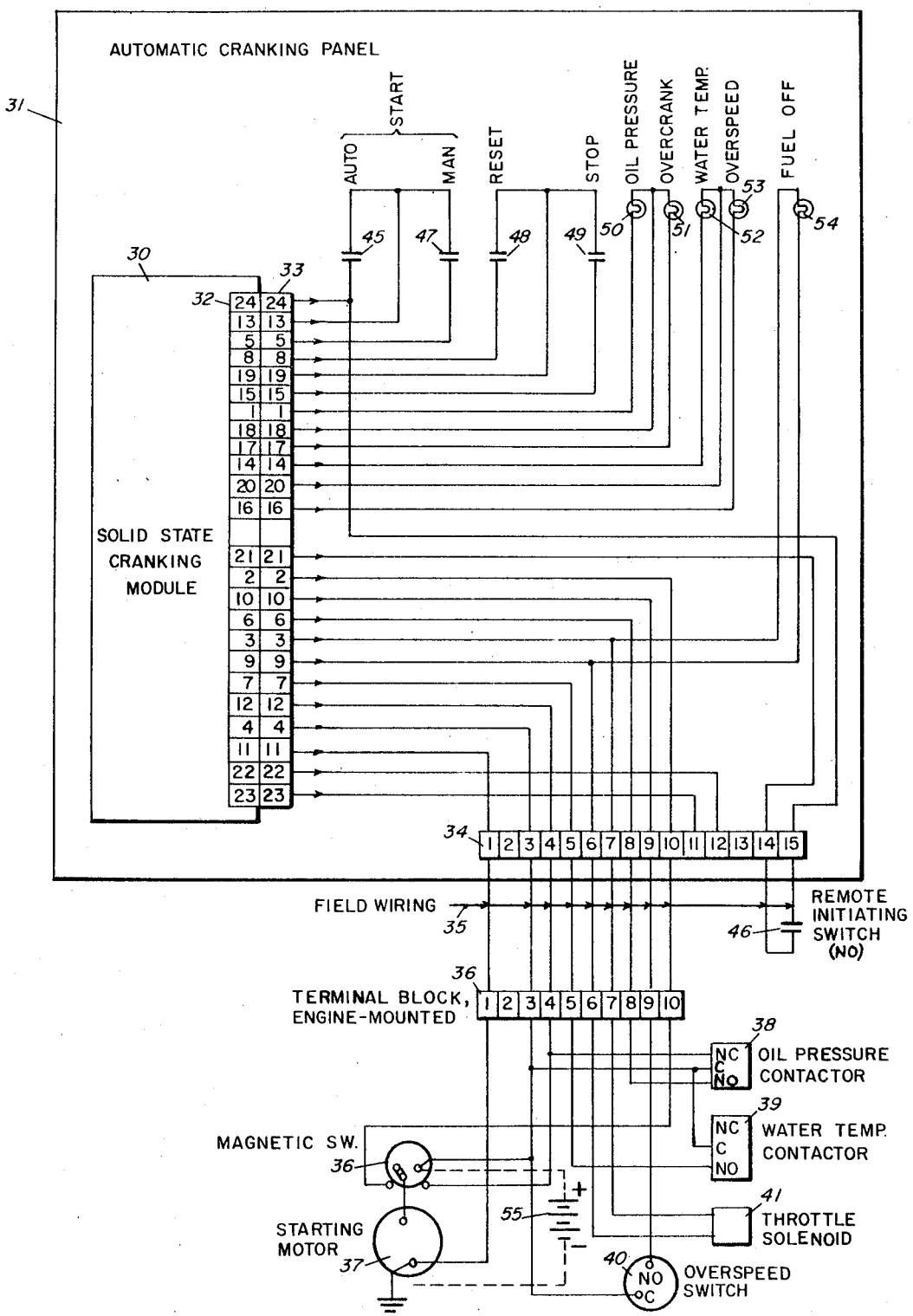
FIG. 1 is a block diagram of the present invention, illustrating the manner in which the cranking module, mode selector switch and indicator lights may be interconnected with the engine starting motor and fault monitoring equipment.

Referring now to FIG. 1 of the drawings, there is illustrated at 30 a solid state cranking module in accordance with the present invention. The module is mounted on a panel 31 which may be located on the engine to be controlled or at a location remote therefrom, as desired. The module is connected through terminal connectors 32 and 33 to the plurality of mode selector switches and indicator lights and through a terminal board 34 to the field wiring 35 leading to the engine and its associated equipment.

A terminal block 36 is mounted on the engine or engine housing to connect a magnetic starting switch 36 and an electric starting motor 37 to the appropriate control circuitry in the module. Additionally, the terminal block 36 serves to connect the fault detection means such as the oil pressure contactors 38, the water temperature contactor 39, and the overspeed switch 40 to the detection circuits in the module 30. Also connected to the module through terminal connectors 32 and 33, terminal board 34, field wiring 35, and terminal block 36 is an electrically operated throttle solenoid 41 which serves to open and close a fuel supply valve to permit the engine to run or to shut it down.

The mode selector switch on the automatic cranking panel 31 includes a normally open "automatic" contact 45 which, when closed, permits the engine to be started from a remote initiating switch 46. Switch 46 may be located some distance from the panel 31 and the internal combustion engine. A "manual" position is provided on the mode selector switch, the manual contact 47, when closed, providing a starting signal to the system. A "reset" position having a normally open contact 48 provides a reset of the overcrank circuit, which circuit is energized when the starting motor operates for more than 30 seconds without starting the internal combustion engine. Closure of the "reset" contact extinguishes the overcrank light and permits a new starting sequence. The final position on the mode selector switch is a "stop" contact 49 which is normally open but which may be manually closed to produce an immediate engine shutdown without the usual ninety second cooling delay. The mode selector switch may be of any desired type, but preferably is a rotary switch having the indicated operating positions. Alternatively, individual toggle switches or their equivalent may be utilized.

Five indicator lights are mounted on panel 31, one for each of the conditions being monitored or controlled by the illustrated embodiment of the system. Thus, indicator light 50 is illuminated when the system is energized, but the oil pressure in the engine is lower than normal. "Overcrank" light 51 is illuminated upon the expiration of the allotted thirty second cranking time when the internal combustion engine has not started. "Water temperature" indicator light 52 becomes illuminated when temperature contactor 39 indicates that the engine has overheated, while "overspeed" indicator light 53 becomes illuminated when overspeed switch 40 provides a signal indicating the internal combustion is running at a speed higher than normal. "Fuel off" indicator light 54 is connected in parallel with the throttle solenoid 41 and becomes illuminated when that solenoid is energized to close the fuel supply valve.

Although the specific operation of the elements heretofore described will be set forth in greater detail below, the general operation of the system will now be set out to provide a clearer basis for understanding the operation of the circuitry in the solid state cranking module 30. Cranking of the internal combustion engine may be initiated in two ways: by placing the mode selector switch in the "manual" position to close contact 47, or by the closure of the remote initiating switch 46 when the selector switch is in the "automatic" position so that series contacts 45 and 46 are closed. Cranking will continue for a thirty second period or until the engine starts and oil pressure comes up to the normal level, whichever comes first. During the cranking period, the low oil pressure indicator 50 will be illuminated. If normal oil pressure is not attained within the allotted thirty seconds, voltage will automatically be shifted from the starter solenoid in the magnetic switch 36 to the throttle solenoid 41 to close the fuel line to the engine. The starting motor 37 will stop turning over the internal combustion engine, the "overcrank" and "fuel off" indicators will illuminate and the low oil pressure indicator 50 will remain illuminated.

When the engine starts during the cranking period, voltage will automatically be removed from the magnetic switch 36, disengaging the starter motor, and the low oil pressure indicator will be extinguished. Low oil pressure, high water temperature and overspeed are the engine fault conditions which are to be monitored in the illustrated embodiment of the solid state cranking module. Other fault conditions may, of course, be monitored, if desired. Should any of the monitored conditions exist, the low oil pressure indicator 50, water temperature indicator 52, or overspeed indicator 53 will be illuminated. When any one of the fault indicator lights becomes illuminated, the "fuel off" indicator 54 will also become illuminated, showing that voltage has been applied to the throttle solenoid 41 to stop the fuel flow to the engine. To stop the engine manually, the mode selector switch is shifted to the "stop" position which will shut down the engine immediately by applying a voltage across the throttle solenoid 41 to shut off the fuel supply. The remote initiating switch 46 may also be used to stop the engine by removing the voltage which was applied to the cranking module upon closure of the switch 46. This method of stopping the engine produces a ninety-second delay between the remote stop command and the actual stopping of the engine, the delay allowing the engine to cool after its load has been removed. When the engine is being shutdown, the "fuel off" indicator 54 will illuminate and will stay illuminated until the engine speed drops to the point where normal oil pressure cannot be maintained. The oil pressure contactors then shift, automatically resetting the system for the next cycle.

Reference is now made to FIGS. 2A and 2B which are a schematic diagram of the system, including the circuitry of module 30, wherein elements in common with FIG. 1 are similarly numbered. The several points of connection between terminal connectors 32 and 33 are separately indicated in FIG. 2 by boxes 1 through 24, each box representing a terminal point having an input from the solid state cranking module and an output to the external circuitry on the panel board 31 or at the engine. The inputs from the cranking module 30 to the various termnal points are identified by means of arrows to aid in the understanding of the invention.

Power to the circuit as well as to the starting motor 37 is provided by a D.C. source such as battery 55 the positive end of the battery being connected through terminal point 4 to the module circuitry. From terminal point 4, the battery voltage is applied by way of line 60 through terminal point 13 to the series arrangement of mode selector switch contacts 45 and 46 and to mode selector switch 47 connected in parallel therewith. Closure of either manual switch 47 or both of the automatic and remote initiating switches 45 and 46 applies the battery voltage through terminal points 5 or 21, respectively, to line 61. The voltage appearing on line 61 is applied through series resistor 62, across capacitor 63, the other side of which is connected to ground, and through resistor 64 to terminal point 22. This starting voltage is then applied through series diodes 65, 66, 67, and 68 and through resistor 69 to the base electrode of a switching transistor Q1. The collector 70 of Q1 is connected to the voltage supply appearing on line 61 while its emitter is connected through resistor 72 to ground. The circuit elements thus far described as being connected to line 61 comprise a cranking switch 75 which is energized by a starting signal appearing on line 61 to operate starting motor 37 (FIG. 1). The output signal derived from the emitter of Q1 is applied through resistor 76 to the base electrode of an amplifier transistor Q2. The emitter of Q2 is connected directly to the base of a second amplifier transistor Q3 which is connected in a grounded-emitter configuration. The collectors of Q2 and Q3 are connected in common to terminal point 2 and thence to the starter solenoid of magnetic switch 36. The collectors of Q2 and Q3 are also connected through diode 77 to the voltage supply on line 60.

Magnetic switch solenoid 36 is connected between points 2 and 12 of the terminal connectors, point 12 being connected through normally-closed contact 38a of the oil pressure contactor 38 to power supply line 78. Line 78 is connected to the positive terminal of battery 55 and thus carries the same voltage as line 60. It should be noted here that the oil pressure contactor 38 is a single pole-double throw pressure switch having a normally-closed contact 38a and a normally-open contact 38b during low pressure conditions. Upon attainment of a normal oil pressure in the internal combustion engine, contact 38a opens and contact 38b closes. When transistor Q3 becomes conductive, a current path is provided from line 78 through normally-closed contact 38a, magnetic switch 36, terminal point 2, and the collector-emitter path of transistor Q3 to ground, thus energizing the starting motor 37. It is apparent that attainment of normal oil pressure will open contact 38a, interrupting the current flow through magnetic switch 36 and deenergizing the starting motor 37.

During the period of low oil pressure, a second current path is maintained through contact 38a. This path includes terminal point 12, line 79, terminal point 18, line 80, low oil pressure indicator lamp 50, terminal point 1 and diode 81 to the collector of a transistor Q4 in stop circuit 87. When transistor Q4 is conductive, this current path is completed through its collector-emitter circuit to ground, thus illuminating oil pressure lamp 50. It will be apparent that this lamp will be extinguished when normal oil pressure is attained and oil pressure contact 38a opens. The collector of Q4 is connected through diode 82 and current limiting resistors 83 and 84 to power supply line 61. The base electrode of Q4 is connected through diode 85 and resistor 86 to line 61, whereby the presence of a start signal on line 61 will cause transistor Q4 to become conductive.

It should be noted that diode 77, which is connected between the collector of transistor Q3 and the battery supply voltage, clamps the collector of Q3 to the battery voltage to prevent damage to the transistor by transient voltages from magnetic switch 36 when contact 38a opens. Normally, such transients would be prevented by connecting the diode directly across the inductor, but such a connection increases the time constant of the coil to the point where deenergization of the magnetic switch, and thus of the starter motor, would be delayed for about one second after the engine has started. This delay could cause starter damage. With the diode connected as shown, it is across the coil of magnetic switch 36 only when contact 38a is closed, thus protecting the transistor from transients, while not slowing down the dropout time. It should be noted that during an overcrank condition, the oil pressure contact 38a does not open and the diode, being connected across the magnetic switch solenoid 36, does produce the one second delay. In this situation, however, the delay is not harmful, for the engine has not started and an additional second of cranking is unimportant.

The foregoing circuitry is effective to initiate cranking of the engine and to provide an indication of engine start, at which time it becomes desirable to deenergize these circuits. The manner in which indicator light 50 is extinguished has been described; the deenergization of transistor Q1 is accomplished as follows. When the engine starts and normal oil pressure is obtained, normally-open contact 38b in the oil pressure contactor is closed, connecting the battery voltage from line 78 through terminal point 6 to line 90. The voltage then appearing on line 90 is applied through resistor 91, across capacitor 92, and through resistor 93 to the anode of a normally-nonconductive silicon controlled rectifier 94 and through a diode 95 to the "fast" input 96 of a first time delay network 97. The delay network 97 is energized by a voltage appearing on one of its two inputs, a "fast" input at 96 or a "slow" input 98. A signal at the slow input of the network 97 causes an output pulse to appear on output line 99 after a delay of approximately thirty seconds, while a signal applied to the fast input pulse at 99 substantially immediately. The output pulse on line 99, which pulse is of relatively short duration, is applied to the base of a transistor Q5, causing Q5 to become conductive and thus grounding the anode of a latching silicon controlled rectifier 100 through line 101 and the collector-emitter path of transistor Q5. By grounding the anode of SCR 100 in this manner, SCR 100 is switched to its nonconductive condition, i.e., it is reset. The output pulse on line 99 is also applied through lines 102 and 103, through capacitor 104 and across grounded resistor 105 to the control electrodes of silicon controlled rectifiers 94 and 110, firing these SCR's. The triggering of SCR 94 clamps the "fast" input 96 of time delay network 97 to ground, preventing further signals to the time delay network through this input until such time as SCR 94 has been reset. This reset is accomplished by removing the voltage applied to the anode of 94 by way of line 90 and resistors 91 and 93, and occurs whenever contact 38b opens by reason of low oil pressure.

When SCR 110 is made conductive by the output pulse from time delay network 97, as described above, transistor Q1 is deenergized, for SCR 110 then grounds terminal point 22 through diode 111 and line 112. Thus, the starting voltage on line 61 is removed from the base electrode of transistor Q1, turning transistors Q1, Q2 and Q3 off. The series arrangement of diodes 65 through 68 in the base circuit of transistor Q1 insures a complete turnoff of Q1 when SCR 110 is triggered. Without the voltage drop provided by these diodes and by resistor 69, transistor Q1 might remain partially conductive, causing excessive power dissipation in the transistor which could cause it to fail. Diode 111 prevents leakage current due to the voltage on line 90 from passing through resistors 113 and 114 in the base circuit of transistor Q6, and through line 112 to the base of Q1, which leakage current could turn transistor Q1 on at undesired times.

In this regard, it should also be noted that resistors 72 and 76 in the emitter circuit of Q1 must be chosen with care, for the leakage current between the base and emitter junction of Q1 and the collector and base junctions of Q2 heats these transistors. As the heat due to leakage current increases, the leakage current itself increases, producing a voltage drop across resistors 72 and 76 which tends to provide a positive bias at the base of Q2 which tends to turn it on. This causes more heat to be generated in the transistor, thus increasing the leakage current, and a continuation of this cycle can produce thermal runaway. To prevent this, resistors 72 and 76 must have a low resistance value to reduce the biasing effect on Q2 and keep the circuit nonconductive when Q1 is turned off.

At this point in the operation of the circuit, the internal combustion engine has been cranked and has started, building up normal oil pressure and deenergizing the starting circuit. At the time that the starting voltage was applied to line 61 to energize the cranking switch circuitry 75, this voltage was also applied through diode 111 to the "slow" input 98 of the time delay network 97. The voltage applied to this input of the timing network produces an output pulse on line 99 after, for example, a thirty-second delay if the engine has not started, or if for some reason oil pressure has not built up to a normal level. This "overcrank" output signal on line 99 is applied through lines 102 and 103 to trigger SCR's 94 and 110 to deenergize transistor Q1 in the manner previously described. The "overcrank" pulse energizes transistor Q5, as described, and also is applied through line 102 and capacitor 115 to the control gate of a silicon controlled rectifier 116 in an overcrank warning circuit 117. This signal fires SCR 116 to complete a circuit through overcrank warning lamp 51. The warning light circuit is traced from power supply line 78 through oil pressure contact 38a, which remains closed when the engine fails to start, through terminal points 12 and 18, through line 80, lamp 51, terminal point 17, across capacitor 118, through resistor 119 and through SCR 116 to ground. It will be apparent that this circuit will not be energized by the pulse on line 99 which appeared as a result of engine start, for that pulse only occurs after contact 38a has opened and contact 38b has closed. Thus, an overcrank condition will deenergize the starting circuit, including transistor Q1, and illuminate the overcrank light 51. SCR's 110 and 116 will remain in their conductive conditions and prevent a repeat of the starting operation until the system is reset. SCR 116 may be reset by grounding its anode through reset contact 48, which contact is connected between the anode and ground through terminal points 8 and 11, respectively.

When the internal combustion engine is in a state of overcrank, there is the danger of flooding the engine when the starting circuit is deenergized; therefore, means are provided to shut off the fuel supply to the engine at this time. This is accomplished by means of the oil fault circuit 120 which includes transistor Q6, this circuit being so named inasmuch as it monitors oil pressure and thus responds to either an overcrank condition or a failure of oil pressure. When the start voltage is initially applied to line 61, this same voltage is applied through line 121, diode 122 and resistor 123 to the collector of transistor Q6. At the same time, the starting signal voltage is applied through diode 111, line 98, line 112, and resistor 114 to the base of Q6, the combined inputs causing Q6 to become conductive. The triggering of SCR 110 by an output from time delay network 97 removes the voltage from line 112, and this normally would remove the bias from the base of Q6. However, when the firing of the time delay circuit is caused by a normal start condition in the engine, the voltage on line 90 is fed through resistor 113 to supply the required bias to the base of transistor Q6. Thus, under normal start conditions, transistor Q6 remains conductive.

When an overcrank situation occurs and SCR 110 is triggered to remove the voltage from line 112, there is no compensating voltage appearing on line 90, since contact 38b remains open, and transistor Q6 becomes nonconductive. When transistor Q6 is turned off, its collector voltage rises and a positive pulse is applied through line 125, diode 126, line 127 and diode 128 to the "fast" input 129 of a second time delay network 130. Time delay network 130 reacts to this fault signal to produce an output pulse substantially immediately on line 131, which pulse is applied through capacitor 132, across grounded resistor 133 to the gate electrode of a silicon controlled rectifier 135. Firing of SCR 135 under this fault condition completes a circuit to ground through the throttle solenoid 41, the circuit being traced from power supply line 78 through contacts 38a, terminal point 12, diode 136, line 137, terminal point 9, solenoid 41, terminal point 3, line 138 and SCR 135. Energization of throttle solenoid 41 closes a fuel supply line valve and illuminates the "fuel off" lamp 54. To return the SCR 135 to its nonconductive condition so that the throttle solenoid 41 will release the fuel valve to permit the start sequence to begin, the "stop" contact 49 is connected across the anode and cathode of SCR 135 by way of terminal points 15 and 19, respectively. Closure of this contact drops the anode voltage to ground level and resets SCR 135. Thus, after an overcrank condition, both contacts 48 and 49 must be closed to reset the system for another start sequence.

Once the engine has been started and it is running under normal conditions, the starting and overcrank warning circuits are held in a deenergized condition by the conduction of SCR's 94 and 110 which clamp the fast and slow inputs of the time delay circuit 97 to ground. Transistors Q4 and Q5 remain conductive by reason of the continuous application of the starting voltage to their respective base electrodes, while all other transistors in the circuit are nonconductive. Contact 38a is open and contact 38b is closed, and all indicator lights are extinguished.

Two methods are provided for stopping the internal combustion engine, one method being for emergency stops and the other providing a normal time-delayed stopping sequence. The emergency stop is accomplished merely by closing stop contact 49 on the cranking panel. Closure of this contact completes a circuit from power supply line 78 through now-closed contact 38b, terminal point 6, isolating diode 140, line 137, terminal point 9, throttle solenoid 41, terminal point 3, line 138, terminal point 15, stop contact 49, and terminal point 19 to ground. This energizes the throttle solenoid and shuts off the fuel supply to the engine, bringing it to a stop.

Shutdown of the engine under normal conditions is accomplished by opening either one of the series contacts 45 and 46 or by opening contact 47, depending upon which contacts were initially closed to start and run the engine. Assuming that the engine was started by closing the remote initiating switch 46, as would be usual with this system, the engine may be shut down by opening switch 46. This removes the starting voltage from line 61 and the positive bias from the base of transistor Q4. An absence of voltage here is a stop signal which causes transistor Q4 to become nonconductive, producing a positive voltage at its collector. This positive voltage passes through diode 82 to line 144 and thence to the "slow" input 145 of time delay network 130. Diode 82 serves to prevent a leakage signal from reaching line 144 through contact 38a and oil pressure light 50. The voltage on line 144 is also applied through line 146, diode 147, resistor 148 and line 125 to the collector of transistor Q6. This voltage replaces the collector voltage on Q6 that is lost when the starting voltage is removed from line 61, which voltage is normally applied to the collector of Q6 through line 121. By using the voltage on line 144 to hold transistor Q6 in its conductive condition, Q6 is prevented from producing a false fault signal during normal shutdown and permits the desired time delay to occur. Furthermore, by retaining transistor Q6 conductive during this normal shutdown period, the oil fault circuit 120 remains sensitive to an oil fault condition, and is thus capable of producing a fault signal if the oil pressure should fail during this period of time. Such a fault signal would result from the opening of contact 38b and consequent removal of voltage from line 90.

The signal applied to the "slow" input 145 of time delay 130 energizes the time delay network to produce an output pulse on line 131 approximately ninety seconds later, this delay period providing sufficient time for the engine to cool after removal of a load. This output pulse is applied to the control gate of SCR 135 to shut down the engine by energizing throttle solenoid 41 in the previously discussed manner. The pulse appearing on line 131 is also applied through line 149, through capacitor 150 and across grounded resistor 151 to the control gate of latching SCR 100, causing this SCR to become conductive. The firing of SCR 100 removes the voltage from the "slow" input of time delay network 130 and prevents generation of any further output pulses on line 131 due to signals on the "slow" input 145.

Thus, under normal shutdown, a single gating pulse is applied to SCR 135 to permit energization of the throttle solenoid 41 ninety seconds after the starting contact is opened. As the engine coasts to a stop, the oil pressure will drop below the normal level and open contact 38b. After a short delay, normally-closed contact 38a will reclose. This short delay period between the opening of contact 38b and the closing of contact 38a produces an instantaneous break in the voltage being applied to the anode of SCR 135, resetting the SCR to its nonconductive condition so that it is ready for the next cycle of operation. This delay time also removes the voltage from line 90 to permit reset of SCR 94, while the opening of contact 46, which removed voltage from line 61, also removed the voltage from the anode of SCR 110 and permitted it to reset. SCR 100 is reset by the operation of transistor Q5, as above-described. The system is then ready for the next start and run cycle.

A fault in either the water temperature, overspeed or oil pressure which occurs during the running of the engine serves to shut down the engine in the following manner. The water temperature and overspeed detecting circuits are connected between the power supply line 78 and ground by way of line 155, these circuits being connected in parallel with each other. The water temperature contactor 39 is connected between line 155 and ground through terminal point 7, line 156, terminal point 14, indicator lamp 52, line 157 and terminal point 20. The overspeed circuit is connected between line 155 and ground through overspeed switch 140, terminal point 10, line 158, terminal point 16, overspeed indicator light 53, line 159 and terminal point 20. Closure of either contact 39 or contact 40 produces a fault signal on line 127 by way of diodes 160 and 161, respectively. The fault signal on line 127 is applied to the "fast" input 129 of time delay network 130, producing an output pulse on line 130 to trigger SCR 135 and energize solenoid 41. An oil pressure fault occuring during operation of the engine will cause contact 38b to open, removing the voltage from line 90 and thus from the base of transistor Q6. Since SCR 110 was fired when oil pressure was initially attained, thus removing the base electrode voltage that would normally be applied through line 112, transistor Q6 becomes nonconductive and produces a fault signal on line 125. This fault signal is applied to the "fast" input of time delay network 130 in the same manner as the other fault signals, producing a triggering action on SCR 135 to energize solenoid 41.

It should be noted here that there is no latching circuit for the "fast" input of the time delay network and therefore the time delay is not limited to a single output pulse upon receipt of a fault signal. On the contrary, the time delay network produces a continuous series of pulses as long as the fault condition exists, and this series of pulses prevents SCR 135 from being reset by the transfer of contacts 38a and 38b. That is, the opening of contact 38b removes the anode voltage from SCR 135, but this voltage is restored upon closure of contact 38a and the continuing pulses from the time delay network 130 will again trigger the SCR, thus holding the fuel supply solenoid valve in its energized, or closed condition. Thus, when the engine shuts down by reason of a fault condition, SCR 135 must be reset manually by closing the stop contact 49 before the engine can be restarted. The fault signal is removed from the input of time delay network 130 by the opening of contacts 39 and 40 and by the removal of the voltage from line 61, thus cutting off the source of the fault signals. As has been noted, any of the fault conditions are capable of bringing the engine to an immediate stop either during the normal running operation or during the ninety-second time delay after the stop signal has been given.

It will be noted that RC networks are included in the anode circuits of all the silicon controlled rectifiers which are subjected to fast-rising anode voltages. These RC networks are necessary to prevent unwanted switching of the SCR's, for it has been found that a fast-rising anode voltage can trigger an SCR even if a gate signal is not present. Thus, resistor 62 and capacitor 63 appear in the anode circuit of SCR 110 to prevent a fast-rising voltage due to the closing of the starting switches from turning it on. Similarly, resistor 64 is provided to limit the current surge from the discharge of capacitor 63 to protect the SCR from burning out. If a fully charged capacitor is placed across a silicon controlled rectifier, and the SCR is triggered, the resultant current surge might possibly damage the SCR. Thus, the capacitor used to correct problems caused by a fast-rising anode voltage can bring about problems due to current surges. SCR 94 is similarly protected from damage by the RC network comprising resistors 91 and 93 and capacitor 92.

It will be noted that all the silicon controlled rectifiers in this circuit are fired by output signals from one or the other of the two time delay networks. When several SCR's are fired from a single pulse source, a problem can arise if one SCR has a gate input impedance which is low with respect to the others, for it could prevent the other SCR's from firing. RC networks are therefore provided in the gate circuits of the SCR's to equalize the gate currents and give more reliable operation.

In order to protect SCR 135 from transient voltages caused by the deenergization of throttle solenoid 41, a protective diode 165 is connected across the solenoid. This connection does not appreciably affect the time constant of the solenoid, for its inductance is considerably less than that of the magnetic switch solenoid 36.

Figure 3:
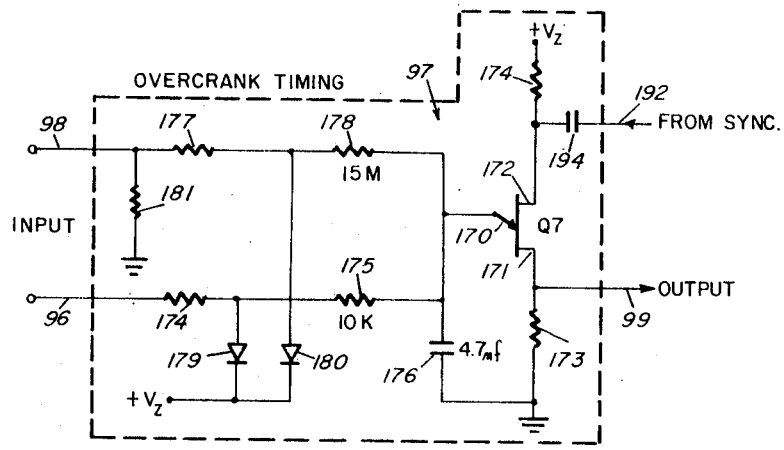
FIGS. 3 and 4 are schematic diagrams of the first and second timing circuits, respectively.

Turning now to a more detailed consideration of the time delay networks, reference is made to FIG. 3 which illustrates time delay network 97. The primary feature of the time delay circuit is the use of a uni-junction transistor Q7 having an emitter electrode 170, a first base electrode 171 and a second base electrode 172. This type of transistor is particularly useful in the present circuit in that it produces a pulse having a fast rise time and which is of sufficient amplitude to drive the various silicon controlled rectifiers of this system. The output pulse is generated across a load resistor 173 connected between base electrode 171 and ground. The other base electrode 172 is connected through a temperature compensating resistor 174 to a source of positive bias voltage $V_z$. When the voltage on emitter electrode 170 is approximately equal to 0.8 $V_z$, a pulse will be generated across resistor 173. By controlling the build-up of voltage on the emitter electrode, the timing of the output pulse can be controlled accurately. Two RC timing networks are provided to control the voltage build-up on the emitter electrode. The first includes input lead 96, current limiting resistor 174, timing resistor 175 and timing capacitor 176. Capacitor 176 is connected between emitter 170 and ground. The RC time constant of this network is of such a value that upon receipt of a signal on input line 96, the voltage on capacitor 176 and thus on emitter 170 builds up to a value sufficient to fire Q7 in a very short period of time, thus producing the fast output pulse. The time-delayed output pulse results from an input signal at line 98, which signal is applied through current limiting resistor 177 and timing resistor 178 to the junction of capacitor 176 and emitter electrode 170. The higher resistance of resistor 178, as compared to resistor 175, produces a slower build-up of voltage on capacitor 176, thus delaying the firing of transistor Q7 and producing the desired "slow" output pulse on line 99. For this circuit, the output on line 99 is delayed for approximately thirty-seconds after the start of an input signal at line 98. Diodes 179 and 180, connected between the current limiting and timing resistors of inputs 96 and 98, respectively, are clamping diodes which serve to hold the inputs to the level of the bias voltage $V_z$. Resistor 181 permits the charge on capacitor 176 to bleed off to ground in the event that the input signal to the timing circuit is removed before the uni-junction transistor fires. This charge must be removed so that the next timing cycle will start out from zero volts.

Figure 4:
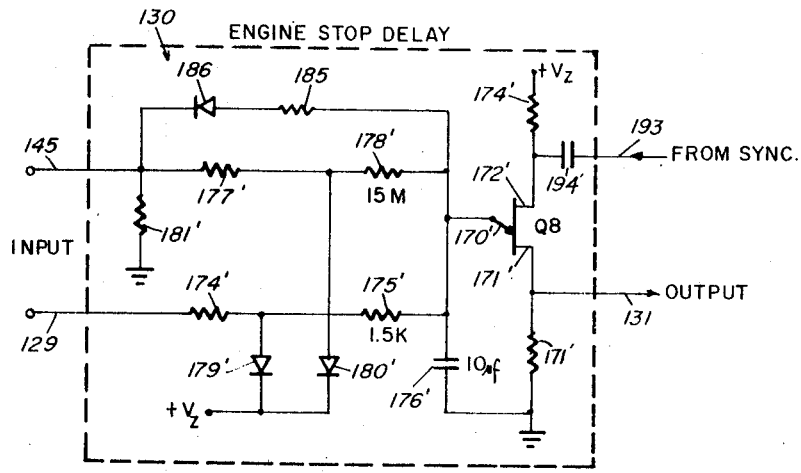

FIG. 4 illustrates the circuitry of time delay network 130 which, except for the values of the RC network controlling the firing of uni-junction transistor Q8, is substantially identical to the circuit of FIG. 3. Circuit elements that are the same as that of FIG. 3 are identified by primed numbers. The timing networks are arranged so as to provide a substantially immedate output pulse upon receipt of a signal on line 129, while an input signal on line 145 produces an output signal after a delay of approximately ninety-seconds. The circuit of FIG. 4 has been modified by the addition of resistor 185 and diode 186, arranged to shunt the high resistance input presented by resistors 177' and 178'. This shunt circuit permits a faster discharge of the capacitor 176' when the input signals are removed from lines 129 and 145.

Figure 5:
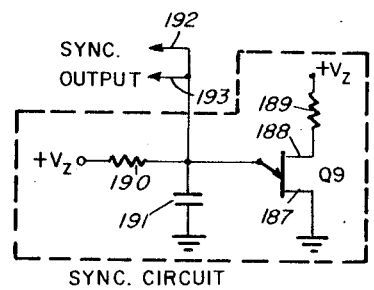
FIG. 5 is a schematic diagram of a synchronizing oscillator for the timing circuits.

It has been found that in order to provide long time delays in a uni-junction transistor timing circuit, it is necessary to couple a negative pulse train of relatively high frequency into the base electrode 172. The reason for this is that there is always some leakage through the uni-junction transistor, and this leakage tends to bleed off the charge on capacitor 176. The leakage is sufficiently great to prevent the capacitor from reaching the voltage level required to produce an output pulse. To compensate for this, the negative pulses on base 172 serve to dip the voltage on down below the bias level established by $V_z$, thereby permitting the uni-junction transistor to fire. The negative pulses are produced in this embodiment by the synchronizing circuit of FIG. 5. This is a free-running oscillator comprised of a uni-junction transistor Q9 having its first base electrode 187 connected to ground and its second base electrode 188 connected through a temperature compensating resistor 189 to a source of positive bias $V_z$. The emitter of transistor Q9 is connected to the junction of an RC network comprised of resistor 190 and capacitor 191, the resistor being connected to a source of bias voltage $V_z$, and the capacitor being connected to ground. The output of this relaxation oscillator is obtained from the junction of the resistor and capacitor, and is applied through lines 192 and 193, to time delay networks 97 and 130, respectively, through capacitors 194 and 194', respectively.

Figure 6:
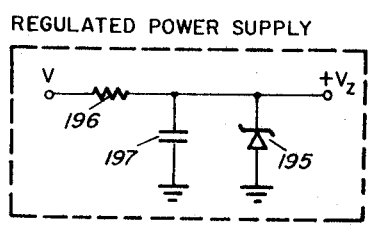
FIG. 6 is a schematic diagram of a suitable power supply for the timing circuits.

Inasmuch as the subject system is capable of operating from a variety of voltage sources, as, for example, batteries having voltages of 12, 24 or 32 volts, it is necessary to provide a fixed voltage level for the timing networks, for these networks are the only part of the circuit that will be affected by differences in the supply voltage. This is accomplished by means of the power supply circuit of FIG. 6, in which a Zener diode 195 is connected between the supply voltage source V and ground through a voltage dropping resistor 196. A filter capacitor 197 is connected in parallel with the Zener diode to prevent extraneous pulse outputs from the timing circuits due to transient surges in the power supply line. Output voltage $V_z$ is obtained from the ungrounded end of Zener diode 195 and provides the required regulated voltage for the timing circuit, thus permitting the system to operate from any desired D.C. source.

Thus there has been shown and described a new and novel system for starting, stopping and monitoring the running of an internal combustion engine. While the fundamental features of the invention have been pointed out with reference to a specific embodiment, it will be understood that various omissions and substitutions in the device as illustrated may be made by those skilled in the art without departing from the spirit of the invention.

We claim:

1. In a solid state cranking module for controlling and monitoring the operation of an internal combustion engine including, an electric starter motor for said engine; cranking switch means for energizing said starter motor; sensing means for sensing the start of said engine and producing a start signal; means responsive to said start signal for deenergizing said cranking switch means and said starter motor after said engine has started; a first time delay network for deenergizing said starter motor a predetermined period of time after it has been energized if said engine fails to start; and stop circuit means for producing a normal stopping pulse; the improvement comprising, a second time delay network having a slow input and a fast input;

means for applying said normal stopping pulse to said slow input, whereby said second time delay network is responsive to said normal stopping pulse to shut down said engine a predetermined delay period after receipt of said normal stopping pulse;

engine fault sensing means responsive to a fault condition for producing a fault signal; and means for applying said fault signal to said fast input of said second time delay network, said second time delay network responding to said fault signal to shut down said engine substantially immediately.

2. The cranking module of claim 1, wherein said sensing means for sensing the start of said engine comprises an engine oil pressure contactor having a normally-closed contact and a normally-open contact during low oil pressure, said contacts transferring from their normal positions when said oil pressure increases to a preset value, said normally-closed contact being in circuit with said cranking switch means, whereby said normally-closed contact opens to deenergize said starter motor when said engine oil pressure reaches said preset value.

3. The cranking module of claim 2, wherein the closure of said normally-open oil pressure contact activates said first time delay network to provide an output pulse substantially immediately, said output pulse from said first time delay network activating first latching circuit means for disabling the inputs to said first timing circuit.

4. The cranking module of claim 1, wherein said first time delay network includes a slow input and a fast input, said module further including means responsive to energization of said starter motor to activate said slow input of said first time delay network, whereby said first time delay network will produce an output signal after a predetermined delay period;

said means responsive to said start signal including means to activate said fast input of said first time delay network to produce said output signal substantially immediately;

latching circuit means for turning off said cranking switch means;

and means for applying the output signal from said first time delay network to said latching circuit means, whereby said cranking switch is turned off when said engine starts or after said predetermined delay period of said first time delay network, which ever occurs first.

5. The cranking module of claim 4, wherein said latching circuit means includes a first silicon controlled rectifier; said module further including indicator means responsive to an output signal after said predetermined delay period of said first time delay network to indicate an overcrank condition, said indicator means including a second silicon controlled rectifier in series with said indicator means, and reset means for each of said first and second silicon controlled rectifiers.

6. The cranking module of claim 1, wherein said stop circuit means includes a transistor which is conductive during starting and running of said engine, and means for cutting off said transistor to produce said stopping pulse.

7. The cranking module of claim 1, wherein said first time delay network includes a fast input and a slow input, said first time delay network responding to a signal at said slow input to deenergize said started motor after a predetermined time period and responding to a signal at said cranking switch means substantially immediately.

8. The cranking module of claim 1, wherein each of said first and second time delay networks includes a uni-junction transistor having first and second base electrodes and an emitter electrode, first and second RC timing networks connected to said emitter electrode for controlling the timing of said uni-junction transistor, and first and second load resistors connected to the first base electrode of each uni-junction transistor, respectively, each of said time delay networks including a fast and a slow input, the fast input being connected to said first RC timing network and the slow input being connected to said second RC timing network, whereby input signals to said fast and slow inputs produce output pulses across said load resistors at predetermined times, depending on the time constants of the respective RC networks.

9. A solid state cranking module for controlling and monitoring the operation of an internal combustion engine comprising:
 starter means including an electric starter motor for said engine, cranking switch means for energizing said starter motor, and a starter switch for activating said cranking switch means;
 a first timer network for deenergizing said starter means and having a slow input and a fast input, said slow input being responsive to said starter switch for producing after a predetermined delay period an overcrank signal;
 first latching means responsive to said overcrank signal for deenergizing said cranking switch means if said engine fails to start within said predetermined delay period;
 sensing means responsive to the starting of said engine to produce a starter signal and means for applying said starter signal to said fast input of said first timer network for immediately producing an output signal to activate said first latching means for deenergizing said cranking switch means, whereby said starter means is deenergized after said predetermined delay period or upon the starting of said engine, whichever occurs first;
 stop circuit means for producing a normal stopping pulse for normal shut-down of said engine;
 a second timer network having a slow input and a fast input, said fast input producing an immediate shut-down pulse in response to one of said fault signals for immediately shutting down said engine in the event of engine malfunction, said slow input producing a delayed shut-down pulse in response to said normal stopping pulse for shutting down said engine a predetermined delay period after receipt of said stopping pulse; and
 means responsive to the occurence of a shut-down pulse to stop said engine.

10. The cranking module of claim 9, further including an overcrank warning circuit and an overcrank fault circuit for producing an output pulse in response to said overcrank signal, said second timer network being responsive to said overcrank fault circuit output pulse for immediately shutting down said engine.

11. The cranking module of claim 10, wherein said second timer network remains responsive to said fault signals and to said overcrank fault circuit output pulse after said engine has stopped, whereby said engine cannot be started while a fault condition exists, and reset means for permitting said engine to be started.

12. The cranking module of claim 9, further including manual emergency stop means for shutting down said engine immediately.

13. The cranking module of claim 9, further including means for preventing a false fault output pulse from said overcrank fault circuit upon operation of said stop circuit means for normal shut-down of said engine, said module remaining sensitive to an engine malfunction during said predetermined delay period whereby a fault signal will override said delay period to produce immediate engine shut-down.

14. The cranking module of claim 10, further including means responsive to said stop circuit means for inhibiting said overcrank fault circuit during normal shut-down of said engine to prevent a false overcrank fault circuit output pulse.

15. The cranking module of claim 14, wherein said engine fault sensing means includes oil pressure contact means operable upon occurrence of a low oil pressure to activate said overcrank warning circuit and said overcrank fault pulse circuit, thereby to stop said engine immediately, even during said predetermined delay period in normal shut-down of said engine.

16. The cranking module of claim 9, wherein said means responsive to said shut-down pulse comprises gating means to cut off the fuel supply to said engine.

17. The cranking module of claim 16, wherein said gating means comprises a solenoid valve which may be energized to cut off said fuel supply and a normally non-conductive silicon controlled rectifier connected in series with said fuel supply solenoid valve, said shut-down pulse serving to gate said silicon controlled rectifier to conduction to energize said solenoid valve.

18. The cranking module of claim 17, further including emergency stop means for bypassing said silicon controlled rectifier to directly energize said solenoid valve and immediately shut down said engine.

19. The cranking module of claim 16, wherein said sensing means responsive to the starting of said engine comprises an engine oil pressure contactor having a normally-open contact and a normally-closed contact during low oil pressure, said contacts transferring from their normal positions to produce said starter signal and de-energize said starter motor when said oil pressure increases to a preset value, and transferring back to their normal positions when said oil pressure decreases below said preset value, said contacts being connected in parallel with each other and in series with said gating means, whereby said gating means can be energized to cut off the fuel supply to said engine under any oil pressure condition.

20. The cranking module of claim 19, further including emergency stop circuit means for bypassing said gating means and energizing said fuel supply solenoid.

21. The cranking module of claim 20, wherein the transfer of said contacts of said oil pressure contactor back to their normal positions as said oil pressure drops below said preset value during normal shut-down of said engine serves to reset said gating means, such transfer back to normal positions during operation of said engine indicating an oil fault condition and producing a fault signal.

22. The cranking module of claim 9, further including second latching means responsive to said shut-down pulse from said second timer means for disabling said stop circuit means, whereby only a single stopping pulse is produced, and wherein said sensing means responsive to the starting of said engine includes a normally-open oil pressure contact, the closure of said normally-open oil pressure contact producing said starter signal for activating said first timer network to provide an output pulse substantially immediately, said output pulse resetting said second latching circuit means, said module further including third latching means responsive to said output pulse to prevent said starter signal from reactivating said first timer network.

23. The cranking module of claim 22, wherein the opening of said normally-open oil pressure contact serves to reset said third latching means.

24. The cranking module of claim 9, wherein said engine fault sensing means includes an oil pressure contact which is normally open during low oil pressure, and oil fault circuit means responsive to the transfer of siad normally-open contact back to its normal position as oil pressure in said engine drops below a preset value to apply said fault signal to said second time delay network.

25. The cranking module of claim 24, wherein said engine fault sensing means further includes engine temperature and speed sensing contactors responsive to abnormal temperature and speed conditions for producing a fault signal.

References Cited
UNITED STATES PATENTS

| | | | |
|---|---|---|---|
| 2,710,926 | 6/1955 | Charles | 290—38 |
| 2,717,317 | 9/1955 | Scott | 290—38 |
| 2,757,295 | 7/1956 | Briggs. | |
| 3,009,067 | 11/1961 | Janeczko et al. | 290—38 |
| 3,130,318 | 4/1964 | Curtis | 290—38 |
| 3,151,249 | 9/1964 | Ives | 290—38 |
| 3,163,769 | 12/1964 | Keuchen et al. | |
| 3,182,648 | 5/1965 | Schneider et al. | 317—19 XR |
| 3,402,327 | 9/1968 | Blackburn | 317—9 |
| 2,510,460 | 6/1950 | Brooke et al. | |
| 2,602,143 | 7/1952 | Bolles. | |
| 3,382,671 | 5/1968 | Ehni | 290—38 |

GLEN R. SIMMONS, Primary Examiner

U.S. Cl. X.R.

123—179; 290—38; 317—21